United States Patent
Kim et al.

(10) Patent No.: US 8,352,640 B2
(45) Date of Patent: Jan. 8, 2013

(54) METHODS OF OPERATING ELECTRONIC DEVICES HAVING USB INTERFACES CAPABLE OF SUPPORTING MULTIPLE USB INTERFACE STANDARDS

(75) Inventors: Sang-Bum Kim, Gyeonggi-do (KR); Sang-Wook Kang, Seoul (KR); Seong-Hyun Kim, Gyeonggi-do (KR); Chul-Joon Choi, Gyeonggi-do (KR); Jong-Sang Choi, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 12/837,431

(22) Filed: Jul. 15, 2010

(65) Prior Publication Data
US 2010/0281187 A1    Nov. 4, 2010

(30) Foreign Application Priority Data
May 30, 2006 (KR) .................... 2006-48944

(51) Int. Cl.
G06F 3/00 (2006.01)
G06F 1/26 (2006.01)
(52) U.S. Cl. .......................... 710/11; 713/300
(58) Field of Classification Search .............. 710/11; 713/300
See application file for complete search history.

(56) References Cited

U.S. PATENT DOCUMENTS

| | | | |
|---|---|---|---|
| 6,883,715 B1 | 4/2005 | Fruhauf et al. | |
| 6,886,052 B2 | 4/2005 | Chiu et al. ................. | 710/14 |
| 7,186,147 B1 | 3/2007 | Chou et al. ................. | 439/660 |
| 2002/0167342 A1 | 11/2002 | Nakada ..................... | 327/58 |
| 2004/0177207 A1* | 9/2004 | Lim et al. ................... | 710/305 |
| 2005/0005045 A1 | 1/2005 | Kim et al. | |
| 2005/0086434 A1 | 4/2005 | Kang et al. | |
| 2006/0047982 A1* | 3/2006 | Lo et al. .................... | 713/300 |
| 2006/0112197 A1* | 5/2006 | Yao ........................... | 710/15 |
| 2007/0033307 A1* | 2/2007 | Yu ............................. | 710/62 |
| 2007/0270038 A1* | 11/2007 | Liu et al. ................... | 439/630 |
| 2008/0010406 A1 | 1/2008 | Kang et al. | |
| 2008/0191304 A1 | 8/2008 | Zhang et al. | |

FOREIGN PATENT DOCUMENTS

DE    102 11 054 A1    10/2003
(Continued)

OTHER PUBLICATIONS

German Office Action (5 pages) corresponding to German Patent Application No. 10 2007 026 077.8-53; Mailing Date: Jan. 14, 2009.

(Continued)

*Primary Examiner* — Henry Tsai
*Assistant Examiner* — Titus Wong
(74) *Attorney, Agent, or Firm* — Myers Bigel Sibley & Sajovec, P.A.

(57) ABSTRACT

An electronic device includes a universal serial bus (USB) interface therein. This USB interface is configured to support at least first and second different USB interface standards. These different interface standards are selected by the electronic device in response to comparing a voltage level of a signal provided to said USB interface relative to a reference voltage generated within the electronic device. The signal provided to the USB may be a power supply signal, the first USB standard may be a USB 2.0 interface standard and the second USB standard may be an inter-chip USB interface standard.

11 Claims, 5 Drawing Sheets

FOREIGN PATENT DOCUMENTS

| | | |
|---|---|---|
| DE | 10 2004 033 3 | 4/2005 |
| DE | 10 2005 032 483 A1 | 2/2006 |
| EP | 1 833 006 A2 | 9/2007 |
| JP | 2001-307038 A | 11/2001 |
| KR | 1020010019863 A | 3/2001 |
| KR | 1020040079694 A | 9/2004 |
| KR | 10-2005-0077106 A | 8/2005 |
| KR | 1020050077106 A | 8/2005 |
| KR | 10-2006-0003260 A | 1/2006 |
| KR | 1020060003260 A | 1/2006 |
| WO | WO 2004/034266 A2 | 4/2004 |

OTHER PUBLICATIONS

German Office Action (6 pages) corresponding to German Patent Application No. 102007026077.8-53; Issue Date: Mar. 20, 2012.
USB Implementers Forum: Inter-Chip USB Supplement to the USB 2.0 Specification. Revision 1.0. Mar. 13, 2006, 4 Pages.

* cited by examiner

METHODS OF OPERATING ELECTRONIC DEVICES HAVING USB INTERFACES CAPABLE OF SUPPORTING MULTIPLE USB INTERFACE STANDARDS

REFERENCE TO RELATED APPLICATIONS

This application is a continuation of U.S. patent application Ser. No. 11/751,104, filed May 21, 2007 now U.S. Pat. No. 7,769,914, which claims priority to Korean Patent Application No. 10-2006-048944, filed May 30, 2006, the disclosures of which are hereby incorporated herein by reference.

FIELD OF THE INVENTION

The present invention relates to devices having USB interfaces therein and methods of operating the USB interfaces.

BACKGROUND OF THE INVENTION

Universal Serial Bus (USB) technology is widely used for communicating data between a computer system and a peripheral device. The USB technology provides interface standardization for connecting peripheral devices, such as a mouse, a printer, a modem, or a speaker with computers. The USB is a type of a serial port supported by a consortium of personal computer manufactures, such as Intel, Compaq, Microsoft, Philips, IBM, and NEC.

The full speeds of a serial port and a USB port are 100 Kbps and 12 Mbps, respectively, for data transmission. Accordingly, various devices may be connected through the USB port without speed limitation. When a computer is in use and peripheral devices are connected through the USB port, the connections are automatically recognized. The peripheral devices connected through the USB port do not need to have internal power supplies. The reason is that power is supplied from a USB host. For example, peripheral devices can connect to a USB host such as a computer through the same USB port without additional software or hardware. Therefore, the number of ports can be drastically reduced. Accordingly, the size of electronic devices, such as a portable terminal, can be minimized.

According to a USB standard, the two terminals connected through a USB port are a host and a USB device, respectively. The host controls the topology management of a bus, the monitoring of a USB device state, device control, and data transmission management through a bus, and supplies a predetermined operating voltage (i.e., a power supply voltage VDD) to the USB device.

As described above, most computers include a USB port such that it is unnecessary to install complex and various adaptors. When data is transferred from a mobile phone or a digital camera to a computer, the USB port is widely used. Due to this convenience of a USB port, terminals connected according to a USB standard (i.e., a USB interface standard) become more extensively used in different applications. That is, the USB standard is utilized to support an external communication between individual terminals, such as a mobile phone or a personal computer, and also to support internal communication (i.e., a local communication) between chips integrated in one system. Accordingly, different USB standards are set depending on application (i.e., according to an external communication between individual devices and an internal communication between chips). In this case, a new USB device is in demand, which performs communication according to different USB standards through one port. Thus, it is necessary to develop a new USB device capable of performing communication in different USB interface standards according to various hosts.

SUMMARY OF THE INVENTION

Embodiments of the present invention include an electronic device having a universal serial bus (USB) interface therein. This USB interface is configured to support at least first and second different USB interface standards. These different interface standards are selected by the electronic device in response to comparing a voltage level of a signal provided to said USB interface relative to a reference voltage generated within the electronic device. In some of these embodiments, the signal provided to the USB is a power supply signal, the first USB standard is a USB 2.0 interface standard and the second USB standard is an inter-chip USB interface standard.

According to additional embodiments of the invention, an electronic device having a universal serial bus (USB) interface is provided. This electronic device includes first and second input/output terminals and first and second transceivers electrically connected to the first and second input/output terminals, respectively. An interface controller is also provided within the electronic device. The interface controller, which is electrically coupled to the first and second transceivers, is configured to transmit and receive first data signals to and from the first transceiver according to a first USB standard (e.g., USB 2.0 interface standard) and is further configured to transmit and receive second data signals to and from the second transceiver according to a second USB standard (e.g., inter-chip USB interface standard).

The electronic device may also include a voltage detector. This voltage detector (e.g., comparator) may be configured to generate a voltage detection signal ($V_{DET}$, $V_{COM}$) in response to comparing a voltage level of a reference signal generated within the electronic device against a voltage level of a signal received at the USB interface. In some embodiments of the invention, the signal received at the USB interface is a power supply voltage. In other embodiments of the invention, the signal received at the USB interface is a signal received at the first input/output terminal. The interface controller, which is responsive to the voltage detection signal, changes configuration between transmitting and receiving to the first transceiver according to the first USB standard and transmitting and receiving to the second transceiver according to the second USB standard, in response to detecting changes in a level of the voltage detection signal. In particular, the interface controller may include a switching device that is responsive to the voltage detection signal and has first and second input terminals electrically coupled to the first and second transceivers, respectively.

DETAILED DESCRIPTION OF PREFERRED EMBODIMENTS

Figure 1:
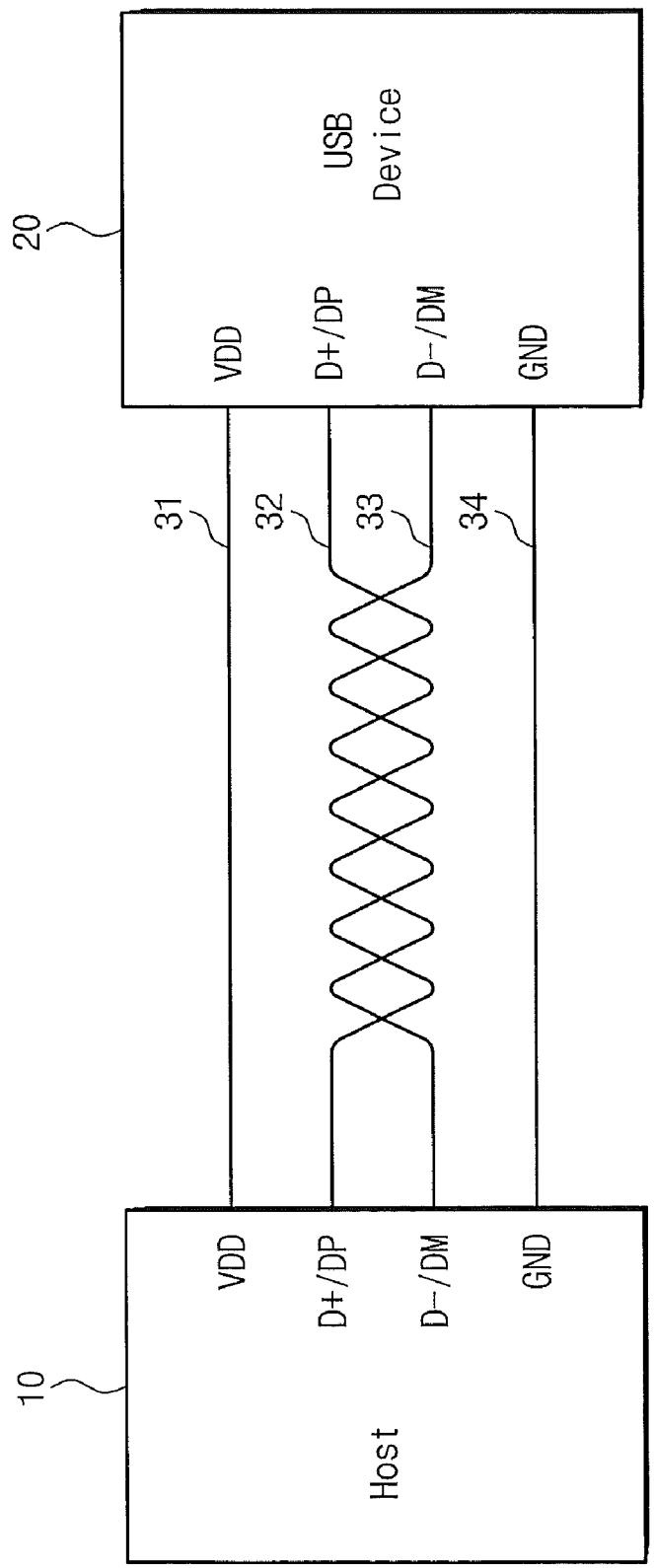
FIG. 1 is a block diagram of a system having USB transmission components therein.

Preferred embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art. Like reference numerals refer to like elements throughout.

FIG. 1 is a block diagram of a USB transmission line. Referring to FIG. 1, a USB connection between a host 10 and a USB device 20 includes four signal lines 31 through 34. A VDD line 31 (i.e., a power supply line), and a GND line 34 are lines supplying a power from the host 10 into the USB device 20. A D+/DP line 32 and a D−/DM line 33 are lines that support serial data communication between the host 10 and the USB device 20. A USB standard for performing communication according to USB Spec. Revision 2.0 is called a "USB 2.0 interface". A USB standard for performing communication within a range of 5 to 10 cm is called an "Inter-Chip USB (IC-USB) interface". A pair of complementary data signals are transmitted onto D+ and D− signal lines by using a USB 2.0 standard, and a pair of complementary data signals are transmitted onto DP and DM signal lines by using an IC-USB standard.

Figure 2:
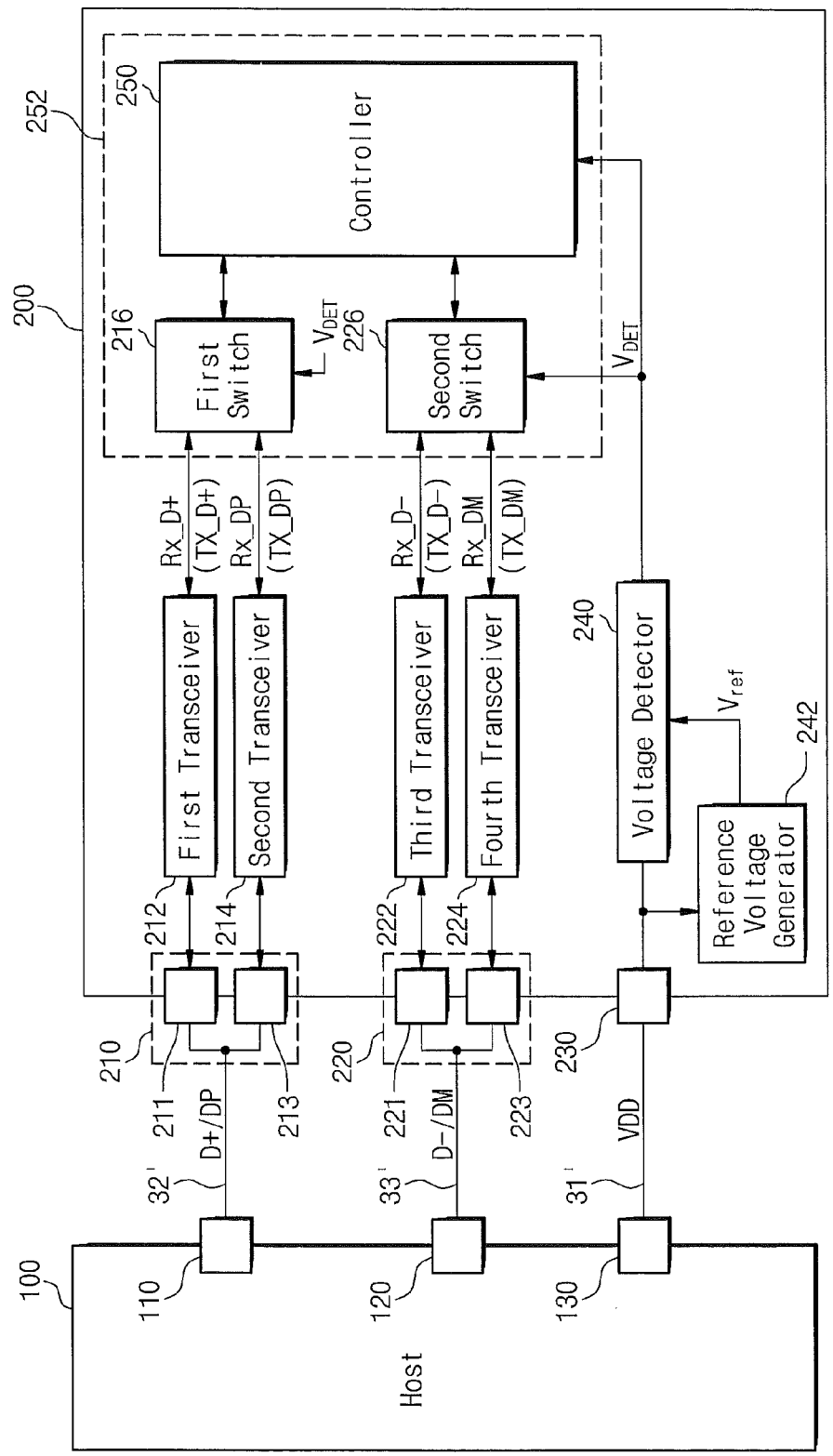
FIG. 2 is a block diagram of a system with a USB interface according to one embodiment of the present invention.

FIG. 2 is a block diagram of a USB device according to one embodiment of the present invention. Referring to FIG. 2, a USB host 100 includes a pad 110 for transmitting and receiving a data signal D+/DP, a pad 120 for transmitting and receiving a data signal D−/DM, and a power supply pad 130 for supplying a power supply voltage VDD. A ground pad (not shown) is also provided for supplying a ground signal (GND) to a ground line (not shown) (see, e.g., FIG. 1). For example, when the USB host 100 utilizes the IC-USB interface for local communication, it transmits and receives the data signals DP and DM. On the other hand, when the USB host 100 utilizes the USB 2.0 interface, it transmits and receives data signals D+ and D−.

The USB device 200 includes first and second pads 210 and 220, a power pad 230, first to fourth transceivers 212, 214, 222, and 224, a voltage detector 240, a reference voltage generator 242, and an interface controller 252. The first pad 210 is an I/O pad for transmitting and receiving the data signal D+/DP, and the second pad 220 is an I/O pad for transmitting the data signal D−/DM. Additionally, the power pad 230 is a pad for receiving the power supply voltage VDD from the host 100.

The interface controller 252 includes a switching unit having two switches 216 and 226 and a controller 250. The interface controller 252 activates first to fourth data paths, and controls a signal exchange with the host 100. The first and second data paths are connected to the first pad 210. The first data path includes a first transceiver 212 connected to the first pad 210, and the second data path includes a second transceiver 214 connected to the first pad 210. The first transceiver 212 transmits and receives a data signal D+, and includes an input/output buffer (not shown) and driver (not shown) according to the USB 2.0 interface. The second transceiver 214 transmits and receives a data signal DP, and includes an input/output buffer (not shown) and driver (not shown) according to the IC-USB interface.

The third data path includes a third transceiver 222 connected to the second pad 220, and a fourth data path includes a fourth transceiver 224 connected to the second pad 220. The third transceiver 222 transmits and receives a data signal D−, and includes an input/output buffer (not shown) and driver (not shown) according to the USB 2.0 interface. The fourth transceiver 224 transmits and receives a data signal DM, and includes an input/output buffer (not shown) and driver (not shown) according to the IC-USB interface.

First to fourth data paths include a data input line and a data output line, respectively. Each of the data input lines is connected to input terminals of the switches 216 and 226 through the pads 210 and 220 and the transceivers 212, 214, 222, and 224. Each of the data output lines is connected to the pads 210 and 220 through a controller 250, switches 216 and 226, and transceivers 212, 214, 222, and 224.

On the other hand, the first pad 210, as illustrated in FIG. 2, has a structure in which two pads 211 and 213 are connected in a double bonding arrangement to a transmission line 32'. Additionally, the second pad 220 has a structure in which two pads 221 and 223 are connected in a double bonding arrangement to a transmission line 33'. In this case, the pads 211, 213, 221, and 223 are connected to the first to fourth transceivers, respectively.

Received data output lines of the transceivers 212 and 214 are connected to input terminals of the first switch 216. The output terminal of the first switch 216 is connected to a controller 250. That is, receive signals RX_D+ and RX_DP input into the first pad 210 are input to the first switch 216 through the transceivers 212 and 214 of the first and second data paths. The first switch 216 selects one of the receive signals RX_D+ and RX_DP and outputs the selected one into the controller 250. Likewise, the received data output lines of the transceivers 222 and 224 are connected to input terminals of the second switch 216, and the output terminal of the second switch 226 is connected to the controller 250. That is, the receive signals RX_D− and RX_DM input into the second data pad 220 are input into the second switch 226 through the transceivers 222 and 224 of the third and fourth data paths, and the second switch 226 selects one of receive signals RX_D+ and RX_DP and then outputs the selected one into the controller 250.

The power pad 230 is connected to a voltage detector 240 and a reference voltage generator 242, respectively. The voltage detector 240 compares a power supply voltage VDD input into the power pad 230 with a reference voltage Vref outputted from the reference voltage generator 242. The voltage detector 240 delivers an output signal Vdet (i.e., the compared result), into the switches 216 and 226, and the controller 250.

The first switch 216 connects one of the input lines in the first and second data paths to the controller 250 in response to the output signal Vdet of the voltage detector 240. That is, the first switch 216 delivers the receive signal RX_D+ outputted from the first transceivers 212 into the controller 250 or delivers the receive signal RX_DP outputted from the second transceivers into the controller 250 in response to the output signal Vdet of the voltage detector 240. Likewise, the second switch 226 connects one of the input lines in the third or fourth data paths to the controller 250 in response to the output signal Vdet of the voltage detector 240. That is, the second switch 26 delivers the receive signal RX_D− outputted from the third transceiver 222 into the controller 250 or delivers the receive signal RX_DM outputted from the fourth transceiver into the controller 250 in response to the output signal Vdet of the voltage detector 240.

The controller 250 processes the receive signals RX_D+ and RX_D− input according to the USB 2.0 method or the receive signals RX_DP and RX_DM input according to the IC-USB method. Additionally, the controller 250 activates one of the output lines in the first and third data paths, and also activates one of the output lines in the second and fourth data paths according to the output signal Vdet of the voltage detector 240. That is, according to the detected result of the voltage detector 240, the controller 250 outputs the transmitted and receive signals TX_D+ and TX_D− into the transceivers 212 and 222 that transmit signals through the USB 2.0 interface or outputs the transmitted and receive signals RX_DP and TX_DM into the transceivers 214 and 224 that transmit signals through the IC-USB interface.

For example, when the USB host 100 transmits signals according to the USB 2.0 interface, it transmits data signals onto D+/DP and D−/DM transmission lines 32' and 33' according to a USB 2.0 protocol. The signals input onto the D+/DP transmission lines 32' are input into the transceivers 212 and 214 through the first pad 210 of the USB device 200. As described above, the transceivers 212 and 222 have a structure according to the USB 2.0 interface, and the transceivers 214 and 224 have a structure according to the IC-USB interface. The transceivers 212, 214, 222, and 224 output the receive signals RX_D+, RX_D, RX_DP, and RX_DM into the switches 216 and 226.

On the other hand, if the USB host 100 transmits data signals and supplies a power supply voltage VDD into a VDD line 31' at the same time, then the power supply voltage VDD is delivered into the voltage detector 240 and the reference voltage generator 242 through the power pad 230 of the USB device 200. The power supply voltage VDD input through the power pad 230 is supplied to a regulator (not shown) inside the USB device 200. The regulator converts the power supply voltage VDD into an internal operating voltage of the USB device 200 and then supplies the internal operating voltage into various internal devices (e.g., controller 250 and transceivers 212, 214, 222, and 224). In this case, the controller 250 includes an additional regulator therein.

The voltage detector 240 compares the reference voltage Vref outputted from the reference voltage generator 242 with the power supply voltage VDD. The reference voltage Vref may be between 3.6 V and 4.5 V. In the USB 2.0 standard operating procedure, the host 100 supplies a power supply voltage in a range of 4.5 to 5.5 V. In the IC-USB standard operating procedure, the host 100 supplies a power supply voltage in a range of 2.7 to 3.6 V. Accordingly, when using a voltage of 3.6 to 4.5 V as a reference voltage Vref, it can be determined that the USB host 100 transmits a signal according to the USB 2.0 standard or not.

The voltage detector 240 generates a signal of a first level (e.g., a high level) when the power supply voltage VDD is higher than the reference voltage Vref, and generates a signal of a second level (e.g., a low level) when the power supply voltage VDD is lower then the reference voltage Vref. The voltage detector 240 delivers the detect signal Vdet into the switches 216 and 226 and the controller 250.

The first switch 216 connects the receiving line of the first transceiver 212 to the controller 250 in response to the detect signal Vdet of a first level. That is, the first switch 216 outputs a signal RX_D+ outputted from the first transceiver 212 into the controller 250 in response to the detect signal Vdet of a first level. Additionally, the second switch 226 outputs a signal RX_D− outputted from the third transceiver 222 into the controller 250 in response to the detect signal Vdet of a first level.

The controller 250 processes the receive signals RX_D+ and RX_D−. For example, the controller 250 encodes a command from the host 100 to perform corresponding operations such as a data storing operation. Additionally, the controller generates transmit signals TX_D+ and TX_D− that will be transmitted to the USB host 100 and then outputs the signals into the transceivers 212 and 222. In this case, the controller 250 selectively activates only the transmitting lines of the transceivers 212 and 222 according to the detect signal Vdet outputted from the voltage detector 240. That is, the controller 250 activates the output drivers of the transceivers 212 and 222 transmitting the signals through the USB 2.0 interface, and then transmits the transmit signals TX_D+ and TX_D− into the transceivers 212 and 222 through the switches 216 and 226. In this case, the switches 216 and 226 output the transmit signals TX_D+ and TX_D− into the transceivers 212 and 222 in response to the detect signal Vdet from the voltage detector 240. The transceivers 212 and 222 then output the transmit signals into the first and second pads 210 and 222, respectively.

Hereinafter, when the host 100 transmits a signal according to the IC-USB standard, the operations of the USB device 200 are identical to the above except for the following operation. Since the operating voltage VDD according to the IC-USB standard is below 2.7 to 3.6 V, the voltage detector 240 outputs the detect signal Vdet at the second level. Accordingly, the switches 216 and 226 connect the receiving lines of the transceivers 214 and 224 to the controller 250 according to the IC-USB interface. That is, the switches 216 and 226 transmit the receive signals RX_DP and RX_DM, which are respectively outputted from the transceivers 214 and 224, to the controller 250. When transmitting the transmit signals to the host 100, the controller 250 enables only the transmitting line (outputting drive) using the transceivers 214 and 224 in the IC-USB interface according to the detect signal Vdet of the voltage detector 240. The controller 250 outputs the transmit signals TX_DP and TX-DM to the transceivers 214 and 224 through the switches 216 and 226.

Figure 3:
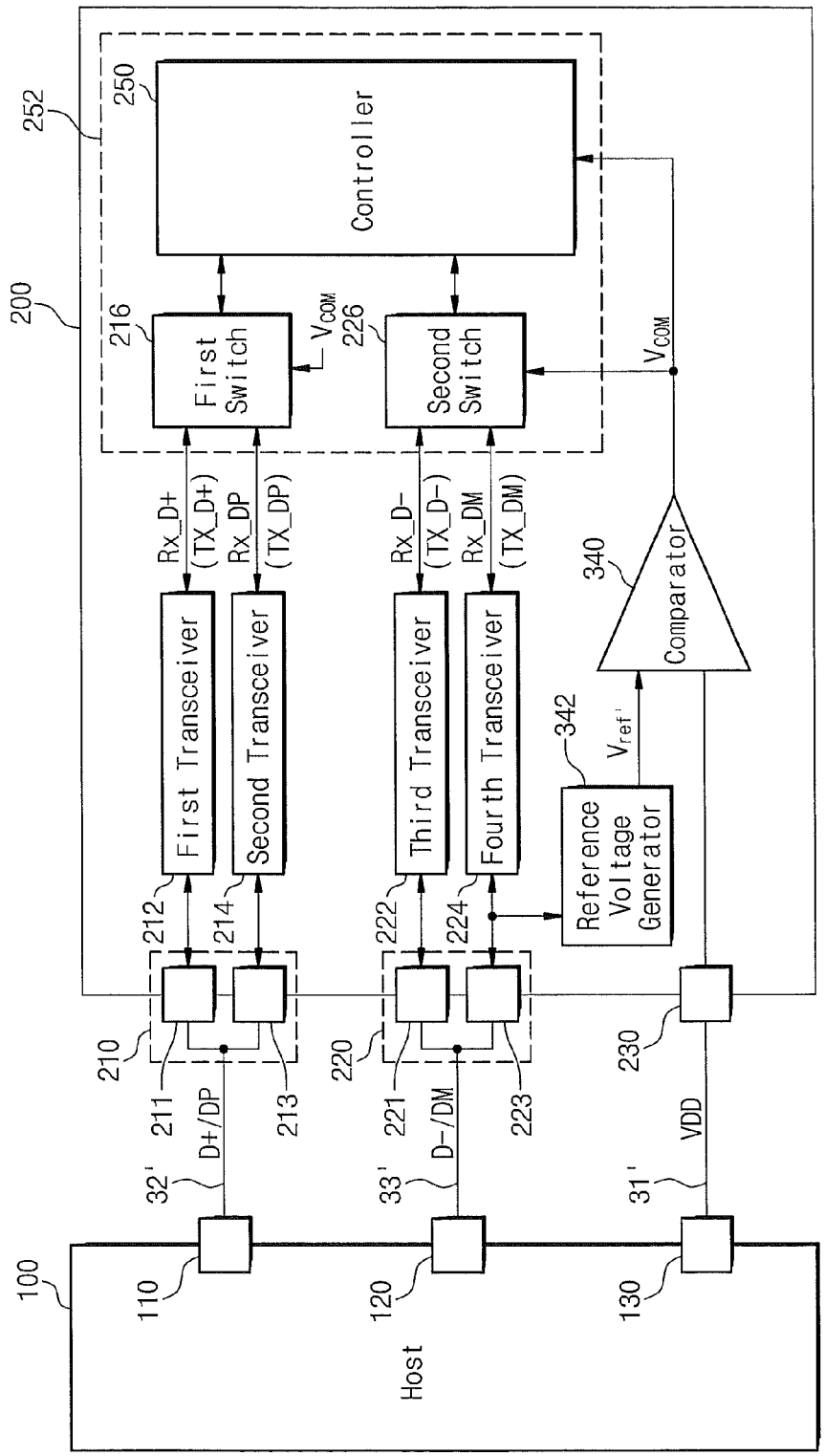
FIG. 3 is a block diagram of a system with a USB interface, according to another embodiment of the present invention.

FIG. 3 is a block diagram of a USB device 300 according to another embodiment of the present invention. The USB device 300 of FIG. 3 is identical to the USB device 200 of FIG. 2 except for a reference voltage generator 342 and a comparator 340. The USB device 300 will be described as follows. Referring to FIG. 3, the reference voltage generator 342 receives a signal input into a second pad 220 to generate a reference voltage Vref'. A comparator 340 compares the reference voltage Vref' with a power supply voltage VDD to generate a result signal Vcom. For example, the comparator 340 generates a signal of a first level when the reference voltage Vref' is unequal from the power supply voltage VDD, and generates a signal at a second level when the reference voltage Vref' is equal to the power supply voltage VDD. In this case, the reference voltage generator 342 generates a voltage as the reference voltage Vref'. The voltage is identical to a high level voltage among data signals outputted from the USB host 200. As shown in FIG. 3, the data signals input into the second pad 220 is delivered into the reference voltage generator 342. Alternatively, the data signal input into the first pad 210 may be delivered into the reference voltage generator 342.

According to the USB 2.0 standard, the power supply voltage VDD is in a 5 V region (4.5 to 5.5 V), and a high level of the data signal is in a 3 V region (2.7 to 3.6 V). On the other hand, according to the IC-USB standard, the power supply voltage VDD and a high level (i.e., a reference voltage Vref) of the data signal have the same voltage region (1.8 V or 3V). Accordingly, when the power supply voltage VDD is different from the high level (i.e., a reference voltage Vref') of the data signal, it is determined that the host includes the USB 2.0 interface. When the power supply voltage VDD is identical to the high level (i.e., a reference voltage Vref') of the data signal, it is determined that the host includes the IC-USB interface.

Figure 4:
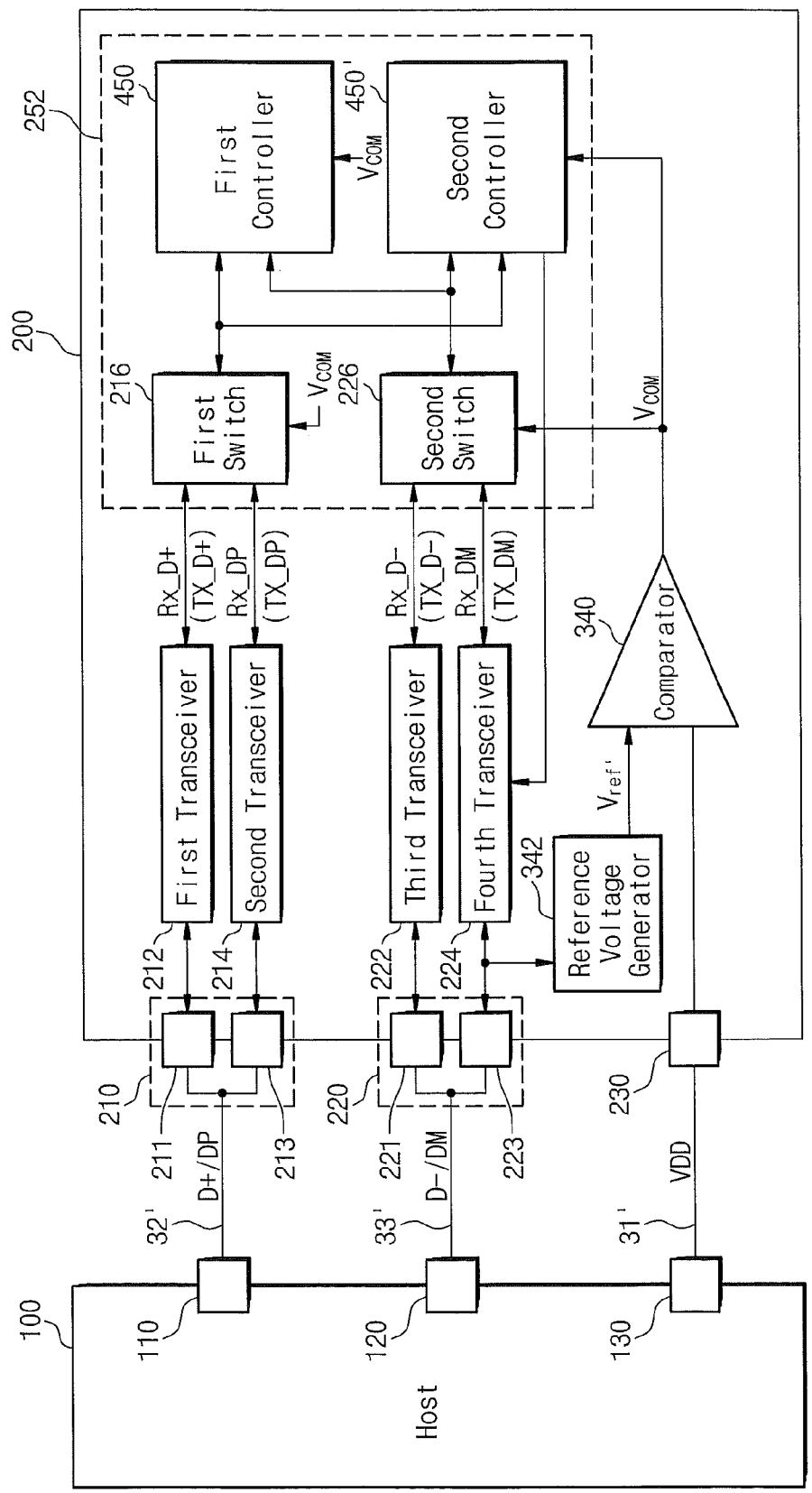
FIG. 4 is a block diagram of a system with a USB interface according to further embodiments of the present invention.

FIG. 4 is a block diagram of a USB device according to further embodiment of the present invention. The USB device 400 of FIG. 4 is identical to that of FIG. 3 except for controllers 450 and 450'. Referring to FIG. 4, the USB device 400 includes two controllers 450 and 450'. The first controller 450 processes signals according to the USB 2.0 standard, and the second controller 450' processes signals according to the IC-USB standard. When there are the two controllers separated from each other according to the USB standard, efficiency of processing signals can be improved. For example, when only one controller is used, an operation of initializing (or, resetting) a signal processing procedure is required when processing receive signals according to the IC-USB standard after processing the receive signals according to the USB 2.0 standard. When there are two separate controllers, each of the controllers processes different signals, thereby directly processing input signals without an initializing (or, resetting) operation.

Figure 5:
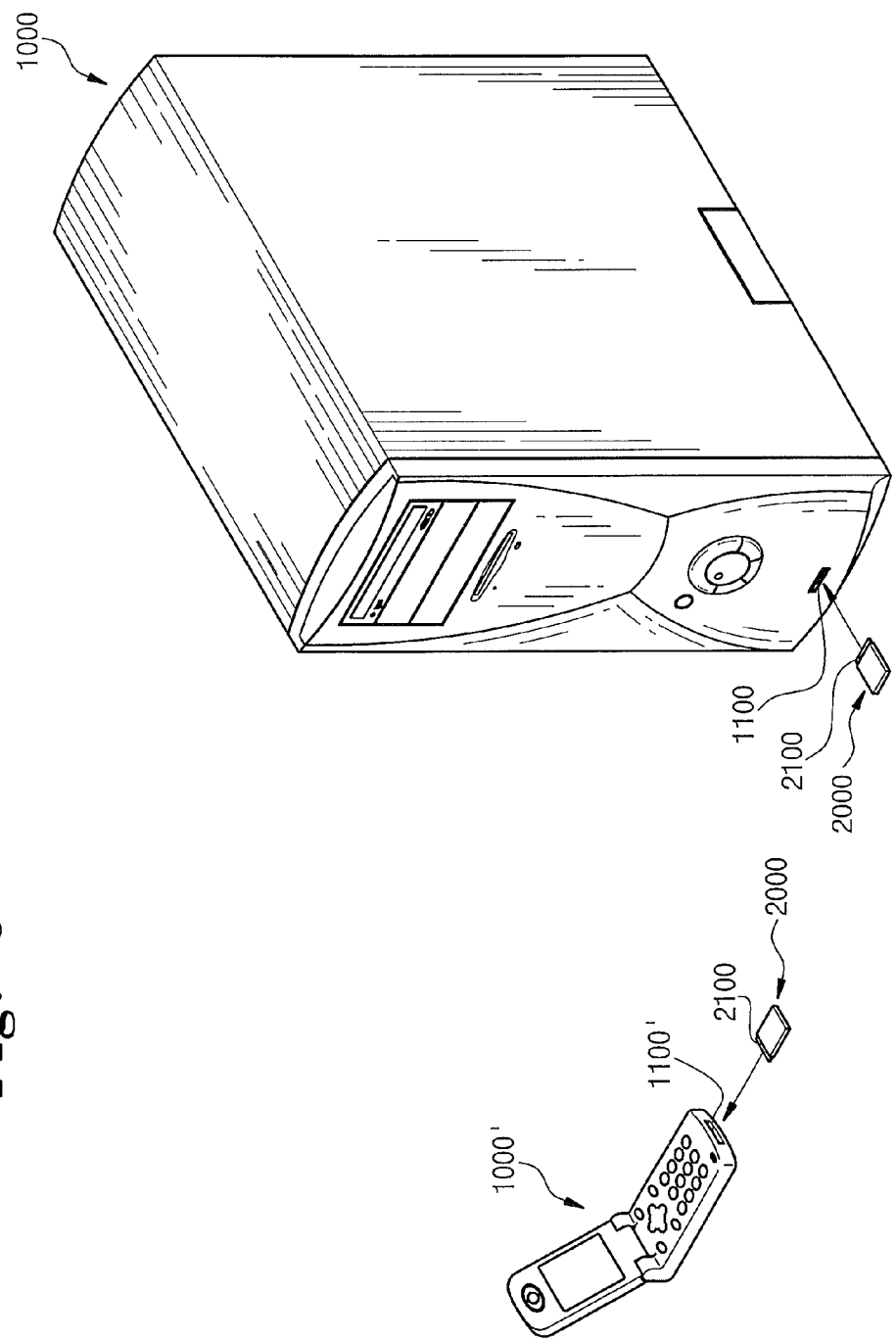
FIG. 5 is a perspective view of a USB host and a USB device according to an embodiment of the present invention.

FIG. 5 is a view of a USB host and a USB device according to an embodiment of the present invention. Referring to FIG. 5, the USB hosts includes a computer system 1000 and a portable communication terminal 1000'. The computer system 1000 includes a USB port 1100 using a USB 2.0 interface. The portable communication terminal 1000' includes a USB port 1100' using an IC-USB interface. For example, the USB device 2000 includes a SIM card. The SIM card is a Subscriber Identification Module card. The SIM card 2000 includes a connection unit 2100 that can be electrically connected to USB ports 1100 and 1100', and is compatible with the USB 2.0 and IC-USB interfaces. That is, when the SIM card 2000 is inserted into the portable communication terminal 1000', it uses the IC-USB interface. When the SIM card 2000 is inserted into the personal computer, it uses the USB 2.0 interface through a USB port. Accordingly, a user takes advantage of a dual interface without adding an additional port or connector.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A method of controlling a USB dual interface of an electric circuit, the method comprising:
   receiving a first power supply voltage or a second power supply voltage from a host;
   generating a reference voltage when either the first power supply voltage or the second power supply voltage is received;
   detecting the first power supply voltage with reference to the reference voltage, or the second power supply voltage with reference to the reference voltage;
   transmitting and receiving a first data signal through a first data path and a third data signal through a third data path in response to a signal generated when the first power supply voltage is detected; and
   transmitting and receiving a second data signal through a second data path and a fourth data signal through a fourth data path in response to a signal generated when the second power supply voltage is detected,
   wherein transmitting and receiving the first and third data signals comprises communicating the first data signal between a first transceiver and a first switch and communicating the third data signal between a third transceiver and a second switch, and
   wherein transmitting and receiving the second and fourth data signals comprises communicating the second data signal between a second transceiver and the first switch and communicating the fourth data signal between a fourth transceiver and the second switch.

2. The method of claim 1, wherein the first power supply voltage is greater than the second power supply voltage.

3. The method of claim 1, wherein the first and third data paths are used for USB 2.0 standard interface and wherein the second and fourth data paths are used for Inter-Chip USB standard interface.

4. The method of claim 1, wherein the first to fourth data paths include a data input line and a data output line, respectively.

5. The method of claim 1, wherein the first and second data paths are connected to a first pad and the third and fourth data paths are connected to a second pad.

6. The method of claim 5, wherein the first and second pads have a structure in which two pads are connected in a double bonding arrangement to a transmission line, respectively.

7. The method of claim 1, further comprising:
   selecting the first data signal and the third data signal when the first power supply voltage is detected;
   selecting the second data signal and the fourth data signal when the second power supply voltage is detected; and
   outputting the selected data signals to a controller.

8. The method of claim 1, wherein one of the first power supply voltage and the second power supply voltage input into a power pad.

9. The method of claim 8, further comprising:
   comparing the input power supply voltage with the reference voltage;
   determining the detected power supply voltage according to the results of the comparison;
   selecting one of the first data signal and the second data signal according to the detected power supply voltage; and
   selecting one of the third data signal and the fourth data signal according to the detected power supply voltage.

10. The method of claim 1, wherein:
    the first and second switches are both operated in response to detecting one of the first power supply voltage and the second power supply voltage;
    the first switch connects one of the first and second data paths to a controller; and
    the second switch connects one of the third and fourth data paths to the controller.

11. A method of controlling a USB dual interface of an electric circuit, the method comprising:
    receiving a first power supply voltage or a second power supply voltage from a host;
    generating a reference voltage when either the first power supply voltage or the second power supply voltage is received;
    detecting the first power supply voltage with reference to the reference voltage, or the second power supply voltage with reference to the reference voltage;
    transmitting and receiving a first data signal through a first data path and a third data signal through a third data path in response to a signal generated when the first power supply voltage is detected, wherein transmitting and receiving the first and third data signals comprises communicating the first data signal between a first transceiver and a first switch and communicating the third data signal between a third transceiver and a second switch; and
    transmitting and receiving a second data signal through a second data path and a fourth data signal through a fourth data path in response to a signal generated when the second power supply voltage is detected,
    wherein transmitting and receiving the second and fourth data signals comprises communicating the second data signal between a second transceiver and the first switch and communicating the fourth data signal between a fourth transceiver and the second switch,
wherein the first and second switches are both operated in response to detecting one of the first power supply voltage and the second power supply voltage,
wherein the first switch connects one of the first and second data paths to a controller, and
wherein the second switch connects one of the third and fourth data paths to the controller.

* * * * *